United States Patent [19]

Betancourt et al.

[11] 4,188,128

[45] Feb. 12, 1980

[54] APPARATUS FOR AUTOMATICALLY KNEADING AND STRETCHING A MIXTURE

[76] Inventors: Jorge Betancourt, 111 73rd St., North Bergen, N.J. 07047; Jose Hernandez, 408-5th St., Union City, N.J. 07087

[21] Appl. No.: 815,728

[22] Filed: Jul. 14, 1977

[51] Int. Cl.² ............................ A21C 1/08; A21C 1/08
[52] U.S. Cl. ........................................ 366/72; 366/73; 366/76
[58] Field of Search ............... 366/71, 69, 72, 73, 366/74, 76, 309; 100/173, 174, 175; 68/264, 268

[56] References Cited

U.S. PATENT DOCUMENTS

| | | | |
|---|---|---|---|
| 103,366 | 5/1870 | Pool | 366/69 |
| 158,266 | 12/1874 | Forman | 366/69 |
| 400,187 | 3/1889 | Bowers | 366/69 |
| 651,532 | 6/1900 | McCrady | 366/69 |
| 1,585,299 | 5/1926 | McLean | 68/264 |
| 1,731,584 | 10/1929 | Mariani | 366/73 |
| 2,247,953 | 7/1941 | Leonard | 68/264 |

Primary Examiner—Robert W. Jenkins
Attorney, Agent, or Firm—Sommers & Sommers

[57] ABSTRACT

An apparatus for automatically kneading and stretching a mixture of ingredients used in the preparation of an article of food such as dough, so as to enable efficient and convenient preparation thereof, including a support, a frame mounted on the support, a pair of shafts rotatably journalled in the frame, one above the other, a pair of rollers, secured to the pair of shafts such that a space is formed between such rollers, means for driving the pair of shafts and the pair of rollers secured thereto so as to generate rotation thereof, and a pan, including a downwardly-inclined top surface on which the mixture of ingredients for the dough is positionable, which pan is positionable on top of the frame so as to feed such mixture of ingredients into the space between the pair of rollers which are driven by the driving means so as to pull the mixture of ingredients therethrough so as to automatically knead and stretch such mixture thereby.

9 Claims, 6 Drawing Figures

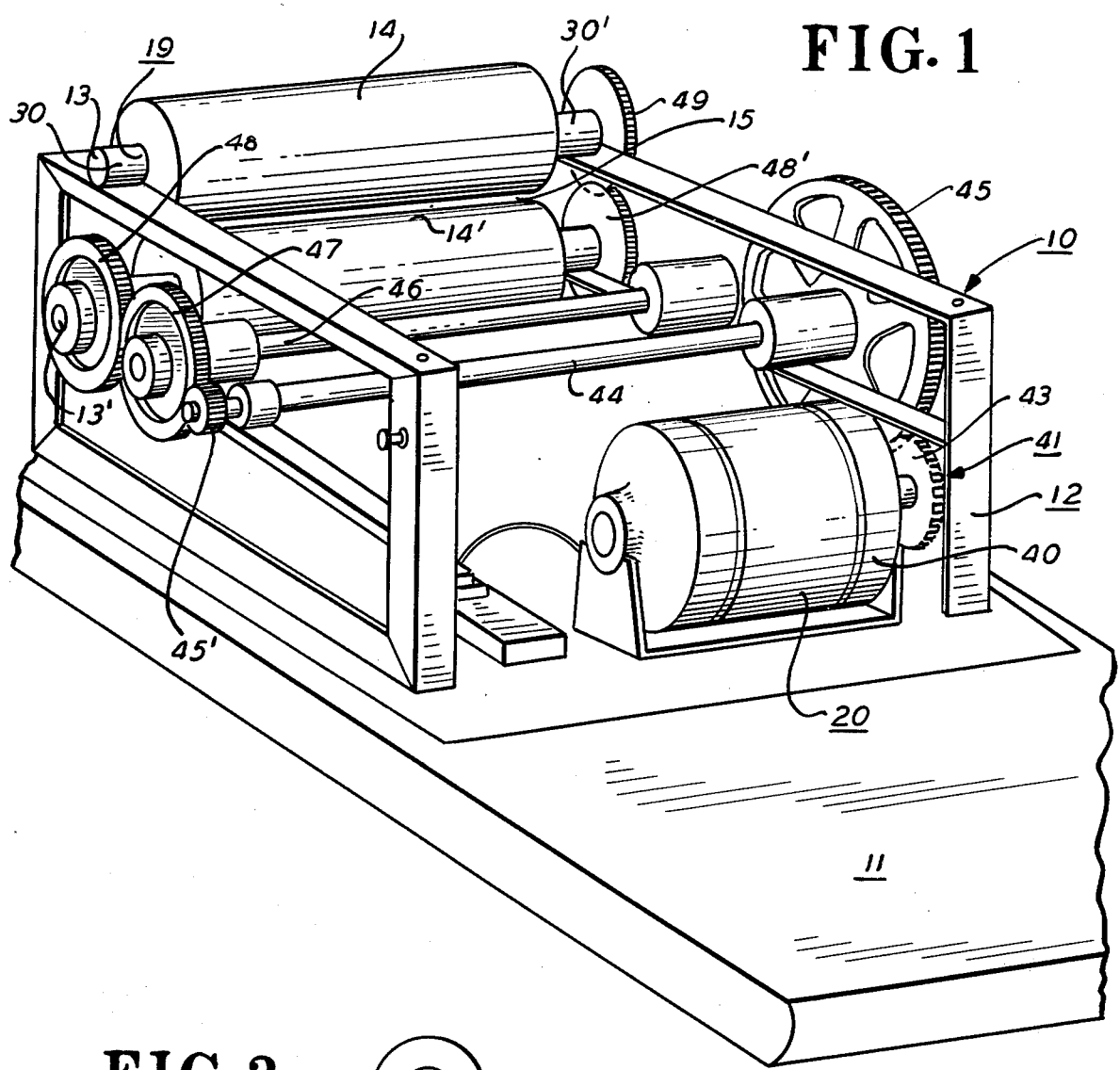
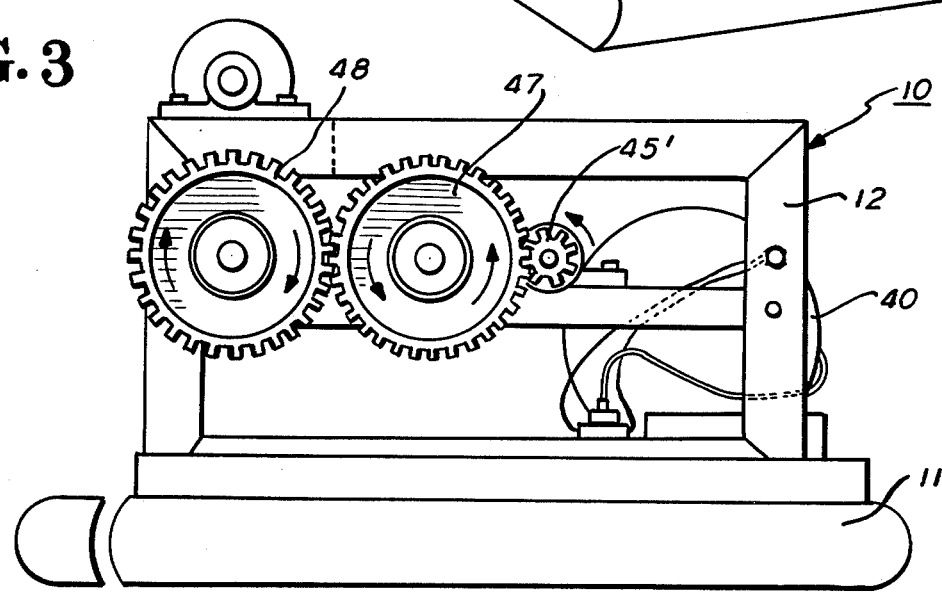

APPARATUS FOR AUTOMATICALLY KNEADING AND STRETCHING A MIXTURE

BACKGROUND OF THE INVENTION

This invention relates generally to devices for preparing mixtures of ingredients used in the preparation of articles of food, and relates specifically to an apparatus for automatically kneading and stretching a mixture of ingredients used in the preparation of an article of food.

Presently, kneading and stretching operations for preparing mixtures of ingredients used in the preparation of articles of food are performed manually, by mixing such ingredients, separating a portion of such mixture, and then blending and stretching such portion of such mixture on a suitable surface manually by using a hand roller thereon. Such blending and stretching operations are difficult to perform, are inefficient and time consuming.

SUMMARY OF THE INVENTION

In view of the foregoing problems associated with presently used devices, one of the objects of this invention is to provide an apparatus for automatically kneading and stretching a mixture of ingredients used in the preparation of an article of food in a labor-saving, convenient and efficient manner.

The foregoing objects, as well as others, are provided for in this invention by means of an apparatus for automatically kneading and stretching a mixture of ingredients used in the preparation of an article of food such as dough, so as to enable efficient and convenient preparation thereof, including a support, a frame mounted on the support, a pair of shafts rotatably journalled in the frame, one above the other, a pair of rollers, secured to the pair of shafts such that a space is formed between such rollers, means for driving the pair of shafts and the pair of rollers secured thereto so as to generate rotation thereof, and a pan, including a downwardly-inclined top surface on which the mixture of ingredients for the dough is positionable, which pan is positionable on the top of the frame so as to feed such mixture of ingredients into the space between the pair of rollers which are driven by the driving means so as to pull the mixture of ingredients therethrough, so as to automatically knead and stretch such mixture thereby.

DESCRIPTION OF THE DRAWINGS

This invention is illustrated, by way of example thereof, in the accompanying drawings, wherein:

FIG. 1 is a perspective view of the support, frame, rollers, and drive means of the automatic kneading and stretching apparatus;

FIG. 3 is a side elevational view of the other side of the automatic kneading and stretching apparatus;

DESCRIPTION OF THE PREFERRED EMBODIMENT

Figure 2:
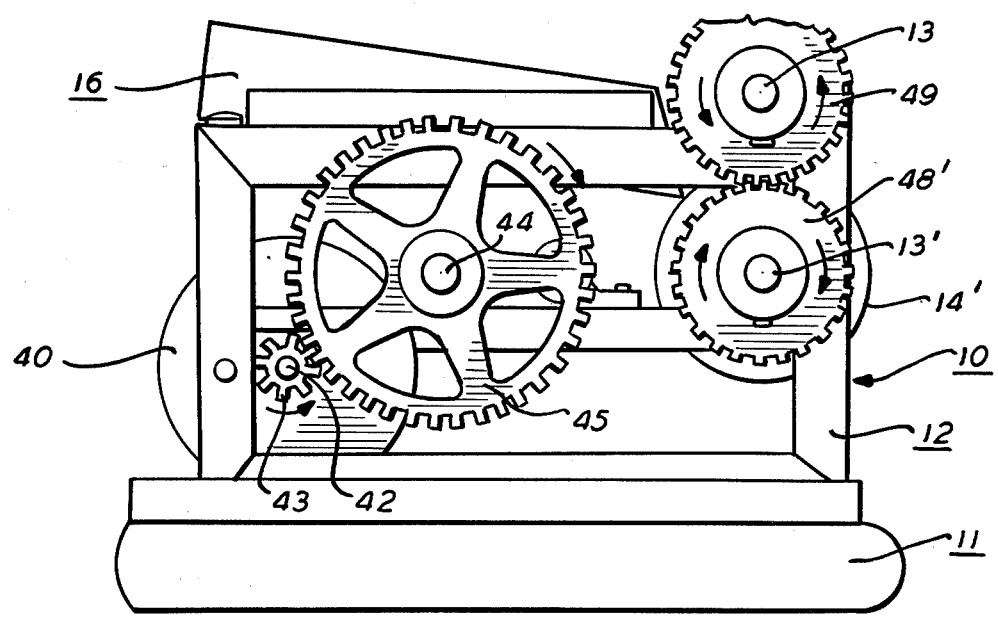
FIG. 2 is a side elevational view of one side of the automatic kneading and stretching apparatus.
Figure 4:
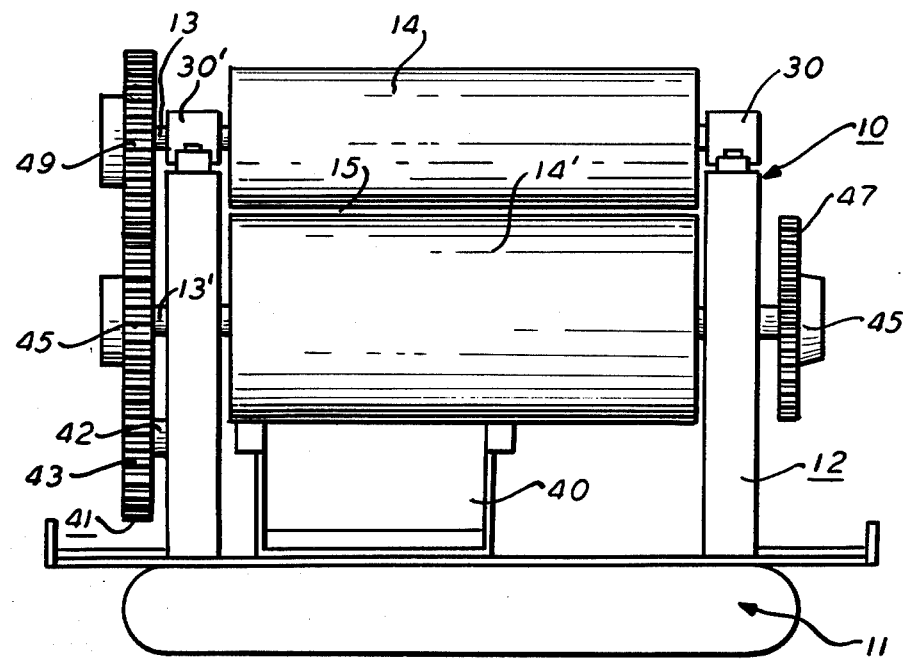
FIG. 4 is a front view of the support, frame, rollers, and drive means of the automatic kneading and stretching apparatus.
Figure 5:
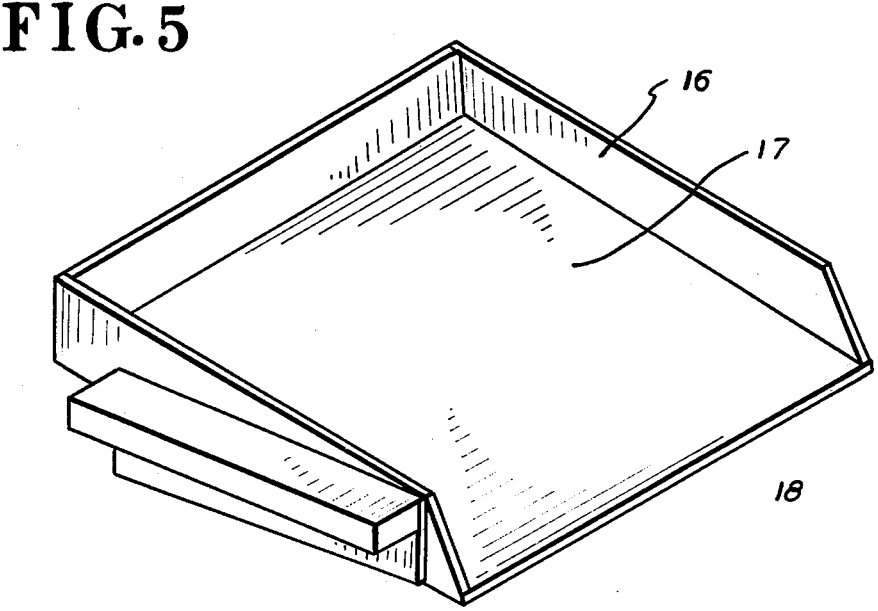
FIG. 5 is a perspective view of the pan of the automatic kneading and stretching apparatus.
Figure 6:
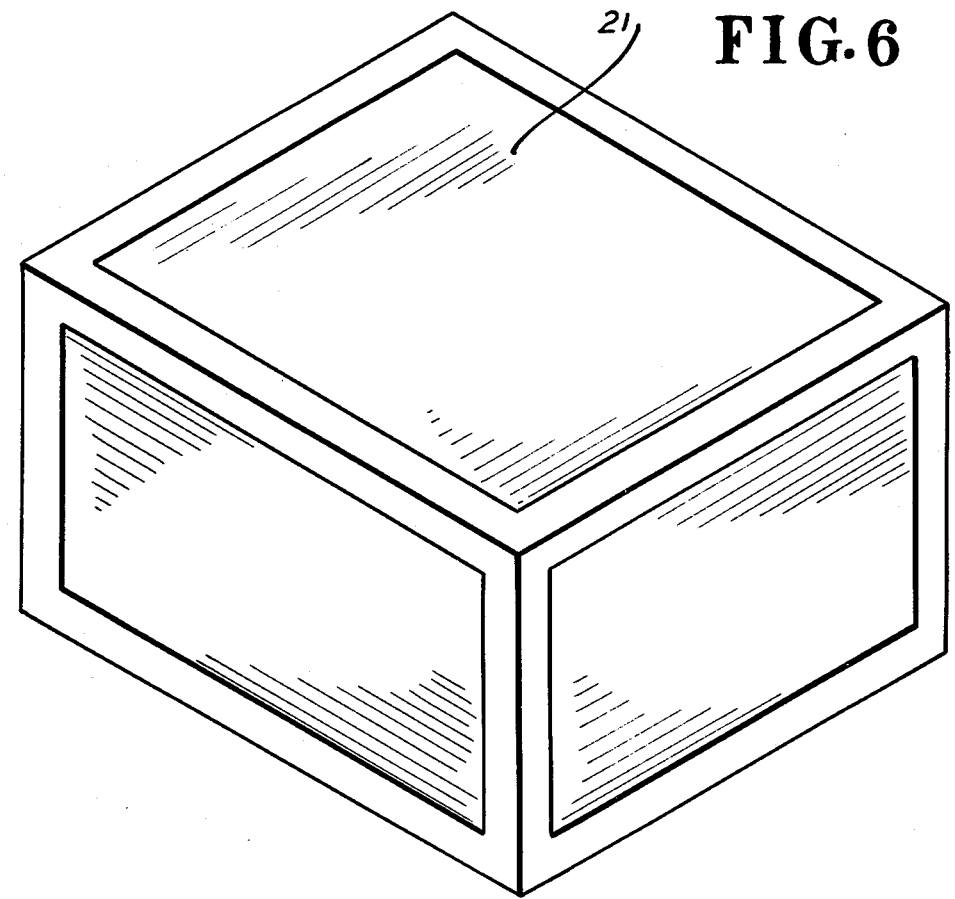
FIG. 6 is a perspective view of the cover of the automatic kneading and stretching apparatus.

In the preferred embodiment of the invention, as illustrated in FIGS. 1-6, for example, the apparatus 10, for automatically kneading and stretching a mixture of ingredients used in the preparation of an article of food such as dough, includes a support 11, a frame 12 mounted on the support 11, a pair of shafts 13, 13' rotatably journalled in the frame 12, one above the other, a pair of rollers 14, 14' secured to the rotatable shafts 13, 13' in the frame 12 such that a space 15 is formed between such pair of rollers 14, 14', a pan 16, including a downwardly-inclined top surface 17 and an open end portion 18 at one end thereof, positionable on top of the frame 12 such that the open end portion 18 is adjacent the space 15 formed between the pair of rollers 14, 14', means 19 for detachably connecting the rollers 14, 14' to the frame 12, means 20 for driving the pair of shafts 13, 13' and the pair of rollers 14, 14' secured thereto, and a cover 21, for enclosing a portion of the support 11, the frame 12, and the elements connected and secured to and positioned on the frame 12. The apparatus 10 may further include means for adjustably positioning the rollers 14, 14' relative to each other so as to vary the space 15 formed therebetween.

The support 11 includes a top surface comprised of stainless steel. The pair of rollers 14, 14' include an outer surface comprised of hard wood, which prevents the adherence of dough thereto, and are coated with a protective material, which further prevents adherence of dough thereto. The roller connecting means 19 comprises bracket clips, such as 30, 30', to which the ends of the shafts 14, 14' are detachably connectable. The roller driving means 20 comprises a motor 40 mounted on the support 11, and means 41 for transmitting the motor drive to the pair of rollers 14, 14', including drive shaft 42 extending from the motor 40, drive gear 43 mounted on the end of drive shaft 42, shaft 44 rotatably journalled in the frame 12, gear 45 mounted on one end of shaft 44 engageable with drive gear 43, gear 45' mounted on the other end of shaft 44, shaft 46 rotatably journalled in frame 12, gear 47 mounted on one end of shaft 46 engageable with gear 45, gear 48 mounted on one end of shaft 14, engageable with gear 47, gear 48', mounted on the other end of shaft 14, and gear 49 mounted on the end of shaft 14', engageable with gear 48'.

In operation, the mixture of ingredients used in the preparation of the article of food, such as mixed flour and eggs used in the preparation of dough, is placed in the pan 16 on the downwardly-inclined top surface 17 thereof. Such mixed ingredients slide down the downwardly-inclined top surface 17 of the pan 16, and through the open end portion 18 thereof, into the space 15 between the pair of rollers 14, 14'. The rollers are driven by the motor 40 through the gears 43, 45, 45', 47, 48, 48', and 49 which rotate the shafts 44 and 46 and the pair of shafts 13, 13' to which the rollers 14, 14' are secured, such that such mixture is pulled through the space 15 between the rollers 14, 14' so as to be pressed therebetween, automatically kneading and stretching the dough, which then flows therefrom onto the stainless steel top surface of the support 11. Such kneaded and stretched dough may then again be positioned in the pan 16 on the downwardly-inclined top surface 17 thereof, and the process may then be repeated until the necessary consistency, thickness, blending and stretching of the dough is achieved thereby.

The rollers 14, 14', are removable from connection to the frame 12 by detachment of the shafts 13, 13', to which such rollers are secured, from the detachable connections therefor, as bracket clips 30, 30', so as to enable efficient cleaning of the outer surfaces thereof. The cover 21, when positioned so as to enclose a portion of the support 11, the frame 12, and the elements connected and secured to and positioned on the frame 12, prevents contamination thereof, as by dust and dirt in the ambient enviornment. The apparatus 10 is small in size and lightweight, enabling portability thereof and further enabling efficient use and operation thereof. The shaft 13' and roller 14' secured thereto may be adjustably positioned relative to the shaft 13 and roller 14, as by lowering or elevating thereof by adjusting adjustment members therefor, so as to vary the space 15 between the rollers 14, 14' to make the dough thinner or thicker.

The invention has been set forth above in terms of a specific embodiment thereof; it is to be understood that variations may be made therein by those skilled in the art, which variations may nevertheless be within scope and spirit of the invention. The invention is therefor to be broadly constued within the scope and spirit of the claims appended hereto.

I claim:

1. An apparatus for automatically kneading and stretching a mixture of ingredients used in preparation of an article of food, comprising:
   (a) a frame, which is portable;
   (b) a plurality of rollers;
   (c) means for supporting the rollers in the frame so as to form an open space therebetween for movement of the mixture of ingredients therethrough;
   (d) means for driving the plurality of rollers, such that the mixture of ingredients may be pulled thereby through the open space therebetween; and
   (e) means for supporting the mixture of ingredients in an inclined position so as to continuously feed such mixture into the space between the plurality of rollers.

2. An apparatus as in claim 1, further comprising means for covering the plurality of rollers, the roller supporting means, the roller driving means, and the mixture supporting means.

3. An apparatus as in claim 1, in which the roller supporting means include means for adjustably positioning the plurality of rollers relative to each other so as to vary the space therebetween.

4. An apparatus as in claim 1, in which the roller supporting means comprise a plurality of shafts, to which the plurality of rollers are secured, a support, and a frame, mounted on the support, in which the plurality of shafts are rotatably journalled.

5. An apparatus as in claim 4, in which the roller supporting means include means for detachably connecting each of the plurality of rollers to the frame.

6. An apparatus as in claim 1, in which the roller driving means comprise a motor, and means for transmitting power from the motor to the pluralty of rollers for driving thereof.

7. An apparatus as in claim 1, in which the mixture supporting means comprise a pan including a downwardly-inclined top surface.

8. An apparatus as in claim 1, in which the plurality of rollers each include an outer surface comprised of hard wood.

9. An apparatus as in claim 1, in which the pluraltiy of rollers each include a protective coating on the outer surface thereof.

* * * * *